United States Patent
Dalvi et al.

(10) Patent No.: US 10,326,850 B2
(45) Date of Patent: Jun. 18, 2019

(54) WEIGHTED EXPERIENCE WEBSITE PERFORMANCE SCORE

(71) Applicant: Microsoft Technology Licensing, LLC, Redmond, WA (US)

(72) Inventors: Vivek Bapuji Dalvi, Redmond, WA (US); Alok Jain, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 270 days.

(21) Appl. No.: 15/182,417

(22) Filed: Jun. 14, 2016

(65) Prior Publication Data
US 2017/0359235 A1    Dec. 14, 2017

(51) Int. Cl.
| | |
|---|---|
| G06F 15/173 | (2006.01) |
| G06F 15/16 | (2006.01) |
| H04L 29/06 | (2006.01) |
| H04L 29/08 | (2006.01) |
| G06Q 30/02 | (2012.01) |

(52) U.S. Cl.
CPC ............ H04L 67/22 (2013.01); H04L 67/42 (2013.01); G06Q 30/0201 (2013.01)

(58) Field of Classification Search
USPC .................... 709/221, 229, 225, 203, 217
See application file for complete search history.

(56) References Cited

U.S. PATENT DOCUMENTS

| | | | |
|---|---|---|---|
| 7,269,643 B2 | 9/2007 | Spaid | |
| 7,321,931 B2 * | 1/2008 | Banerjee | G06F 16/95 709/224 |
| 7,685,209 B1 * | 3/2010 | Norton | G06F 17/30997 707/803 |
| 8,095,644 B2 | 1/2012 | Papadimitriou et al. | |
| 8,255,273 B2 | 8/2012 | Lv et al. | |
| 8,442,984 B1 | 5/2013 | Pennock et al. | |
| 8,498,990 B2 | 7/2013 | Heber | |
| 9,037,638 B1 * | 5/2015 | Lepeska | H04L 67/2847 709/203 |

(Continued)

FOREIGN PATENT DOCUMENTS

CA    2612895 C    8/2012

OTHER PUBLICATIONS

Saeid, et al., "Rank-Order Weighting of Web Attributes for Website Evaluation", In International Arab Journal of Information Technology, vol. 8, No. 1, Jan. 2011, pp. 30-38.

*Primary Examiner* — Jude Jean Gilles
(74) *Attorney, Agent, or Firm* — Workman Nydegger

(57) ABSTRACT

Determining the efficiency of a website. A method includes identifying a plurality of webpages for the website. The method further includes identifying how often each of the pages is accessed when the website is accessed as compared to other webpages in the plurality of webpages. The method further includes creating a weight, for each page, based on a measure of how often each of the pages is accessed when the website is accessed as compared to other webpages. The method further includes determining how efficiently each of the webpages loads. For the website, the method further includes determining an overall efficiency by combining the efficiencies of the individual webpages in the plurality of webpages, where each webpage's efficiency is combined into the overall efficiency according to the weight of the webpage.

20 Claims, 2 Drawing Sheets

(56) References Cited

U.S. PATENT DOCUMENTS

| | | | |
|---|---|---|---|
| 9,106,607 B1* | 8/2015 | Lepeska | H04L 67/2847 |
| 9,152,729 B2 | 10/2015 | Ajoku et al. | |
| 9,195,944 B1 | 11/2015 | Ofitserov | |
| 2004/0019677 A1* | 1/2004 | Fukumoto | G06F 11/3447 |
| | | | 709/224 |
| 2005/0120024 A1* | 6/2005 | Tharpe, Jr. | H04L 29/12594 |
| 2005/0216457 A1* | 9/2005 | Walther | G06F 17/30696 |
| 2005/0232131 A1* | 10/2005 | Bulleit | G06F 17/30867 |
| | | | 370/200 |
| 2006/0271669 A1 | 11/2006 | Bouguenon et al. | |
| 2007/0106641 A1 | 5/2007 | Chi et al. | |
| 2007/0156636 A1* | 7/2007 | Norton | G06F 17/30867 |
| 2008/0306830 A1 | 12/2008 | Lasa et al. | |
| 2009/0204573 A1* | 8/2009 | Neuneier | G06F 11/3438 |
| 2009/0216760 A1* | 8/2009 | Bennett | G06F 17/30864 |
| 2012/0290399 A1* | 11/2012 | England | G06Q 30/0282 |
| | | | 705/14.66 |
| 2012/0331129 A1* | 12/2012 | Seifert | G06F 16/957 |
| | | | 709/224 |
| 2014/0280182 A1* | 9/2014 | Anderson | G06F 11/3495 |
| | | | 707/741 |
| 2014/0380151 A1 | 12/2014 | Aganovic | |
| 2015/0039746 A1 | 2/2015 | Mukherjee et al. | |
| 2016/0019310 A1 | 1/2016 | Liu | |
| 2016/0094615 A1* | 3/2016 | Wiener | G06F 16/972 |
| | | | 709/217 |
| 2017/0034302 A1* | 2/2017 | Han | H04L 67/327 |

* cited by examiner

WEIGHTED EXPERIENCE WEBSITE PERFORMANCE SCORE

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems' ability to be interconnected to other computing systems via network connections. The connections allow a computing system to access services at other computing systems and to quickly and efficiently receive data from other computing systems.

Computing systems can connect to so-called websites. A particular website includes a number of different webpages which can be static webpages or which can be dynamically generated webpages. Users are able to access different webpages at different efficiencies. For example, one webpage on a particular website may load quickly for the user such that the user can quickly access information from the webpage. However, a different webpage on that particular website may load less quickly and thus be less efficiently accessed by the user.

A user's experience with a website may be an aggregation of the user's experience with the various different webpages of the website that the user interacts with when accessing the website. Thus, certain webpages on a website may negatively affect the user's interactions with the website while other webpages on the website may positively affect the user's interactions with the website.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for determining the efficiency of a website. The method includes identifying a plurality of webpages for the website. For each of the pages in the plurality of webpages, the method further includes identifying how often each of the pages is accessed when the website is accessed as compared to other webpages in the plurality of webpages. For each of the pages in the plurality of webpages, the method further includes creating a weight based on a measure of how often each of the pages is accessed when the website is accessed as compared to other webpages in the plurality of webpages. For each of the webpages in the plurality of webpages, the method further includes determining how efficiently each of the webpages loads. For the website, the method further includes determining an overall efficiency by combining the efficiencies of the individual webpages in the plurality of webpages, where each webpage's efficiency is combined into the overall efficiency according to the weight of the webpage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein can provide an objective measure of a website's performance against predefined performance targets. In particular, embodiments can take into account the number of impressions each webpage on a website gets with respect to impressions of other webpages on the website to calculate a score where the score is based on a target performance for each of the webpages. In particular, a score for a website is computed by weighting each of the webpages in the website according to the number of impressions for each webpage as compared to other webpages in the website with respect to a target performance measure. Embodiments thereby focus on the right set of webpages in a website to provide a performance score that is reflective of how customers experienced the website.

When webpages are identified in a website that do not meet target efficiencies, remedial actions can be taken. In some embodiments, system resources may be devoted to correcting problems with those webpages to help them meet target efficiencies. For example, in some embodiments, the webpages may be automatically analyzed for errors and/or other issues. The webpages may be suppressed to prevent users from using the webpages not meeting efficiencies. Other system resources, such as compute, memory, and/or storage resources may be automatically devoted to the webpages not meeting efficiency targets to improve the webpages efficiency. This can help a webserver have better performance for a given website. Thus, the webserver will be better performing than previous webservers.

Figure 1:
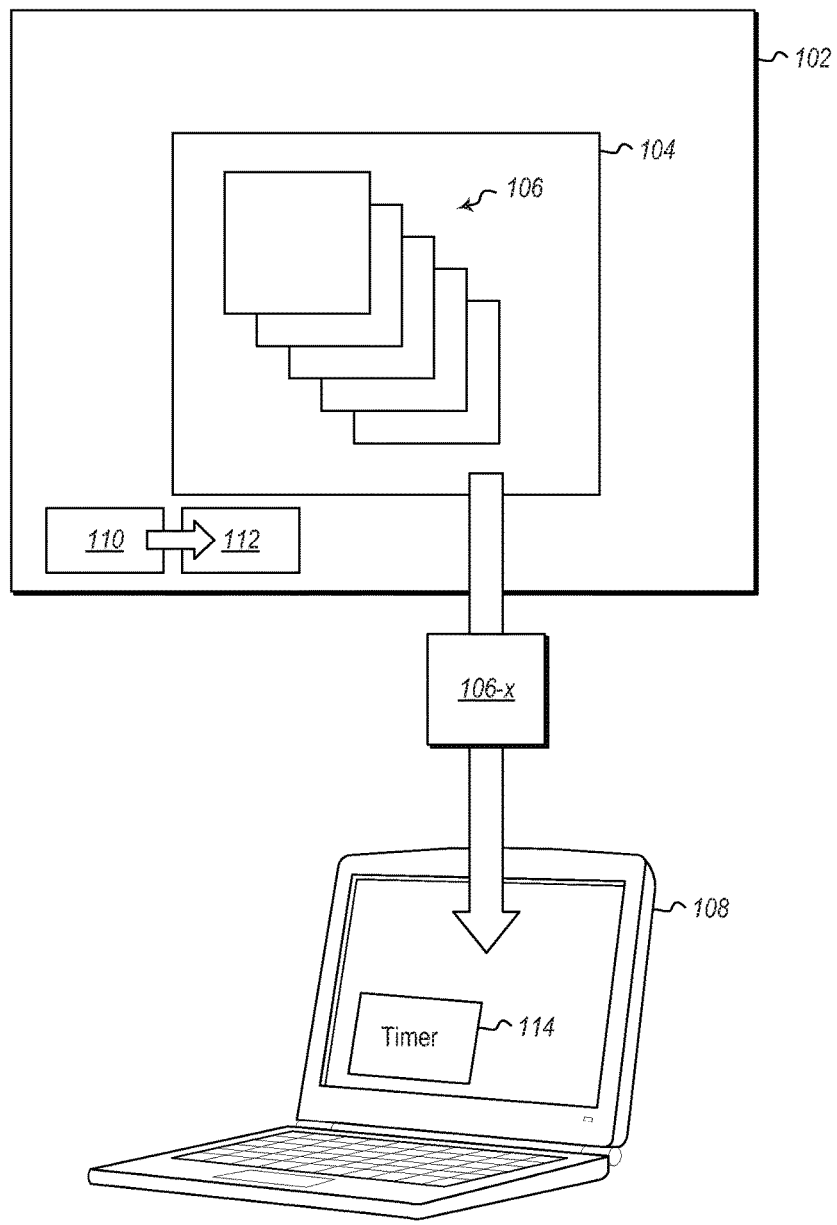
FIG. 1 illustrates a website server environment configured to compute website efficiency using weighted webpage efficiencies.

Referring now to FIG. 1, an example is illustrated. FIG. 1 illustrates a server 102 which hosts a website 104. The website 104 includes a plurality of webpages 106. The webpages 106 can be provided to client computer systems such as the client computer system 108. In particular, the client computer system 108 can request a webpage from the server 102 hosting the website 104. The webpage can then be delivered to the client 108.

The user at the client 108 will perceive an efficiency of the website 104. The efficiency perceived by the user at the client computer system 108 will depend on how quickly webpages from among the plurality of webpages 106 are delivered to the client computer system 108. As the client computer system 108 interacts with the website 104, it may request a number of different webpages during a session with a website 104. Thus, the user at the client computer system 108 will have an overall perception of the responsiveness of the website 104.

However, this overall perception of the responsiveness of the website 104 may be determined by the responsiveness of some webpages more than other webpages from among the plurality of webpages 106. For example, if a session between a client computer system 108 and the website 104 results in certain webpages being accessed more often than other webpages, then the user's overall perception of the responsiveness of the website 104 will be heavily influenced by the responsiveness of the webpages that are more often accessed. Additionally or alternatively, a website's responsiveness may be determined based on a plurality of different client computer systems interacting with a website 104. If certain webpages from the website 104 are accessed more often than other webpages from the website, then those webpages will have more of an effect on perceived responsiveness across multiple users at multiple client computing systems which access the website 104.

In particular, embodiments are directed to measuring the quality of a website. Embodiments can examine individual webpages on the website and determine their performance with respect to some target goal. For example, if a given webpage should load in 1 second, according to some predetermined target, but the webpage takes 2 seconds to load, then the webpage is only 50% efficient. However, a webpage that should load in one second, according to some predetermined target, and does in fact a load in one second would be 100% efficient.

Each webpage in the website may have a different goal. For example, some webpages may have a target goal of loading in 1 second while other webpages have a target goal of loading in 2 seconds. Thus, if it takes 2 seconds for one of the first webpages to load, that webpage is only 50% efficient whereas if it takes 2 seconds for one of the second webpages to load, that webpage is still 100% efficient. Metrics are then determined for all of the webpages in the website and the combined metrics of the different webpages are used to determine the efficiency of the website.

Additionally, embodiments can examine the website and determine which webpages in the website are those that are most accessed webpages that are most accessed will be weighted higher when determining the overall efficiency of the website. Thus for example, consider a case where a single webpage may be accessed 50% of the time that the website is accessed. The website may include an additional 50 pages that are each only accessed 1% of the time that the webpages are accessed. The first webpage that is accessed 50% of the time will have 50 times the weight as each of the other 50 webpages. Thus for example even when each of the other 50 additional pages are 100% efficient, the single webpage that is accessed 50% of the time, if only 50% efficient, will bring the overall efficiency of the website down to 75%.

In other embodiments, the efficiency may be measured as an absolute value. In this way all webpages in the website are treated equally and not evaluated against some target. Rather, a metric is determined for each webpage in an absolute fashion for determining the overall efficiency of the website. However, the overall efficiency metric may nonetheless weight individual webpages by the frequency the webpages are accessed as compared to other webpages in the website.

In some embodiments, the server 102 includes functionality for determining webpage efficiency and website efficiency. For example, FIG. 1 illustrates that the server 102 includes a timer 110. The timer 110 is configured to determine how quickly a webpage loads.

In some embodiments, determining how quickly a webpage loads could include determining how long it takes to create a dynamic webpage. Alternatively or additionally, the server 102 may receive information from the client computer system 108 with the request for the webpage indicating when the webpage was requested. The server 102 can identify when the webpage is sent to the client computer system 108. In some embodiments, the client computer system 108 may be configured to send a time stamp back to the server 102 indicating when the webpage has been loaded at the client computer system 108. In some embodiments, the client computer system may include a timer 114 that can provide information to the server 102 indicating how long it took to render a webpage at the client computer system 102. Thus, various different embodiments may use different calculations are determinations for determining how quickly a webpage is loaded.

In some embodiments, the calculation may include the amount of time to generate the webpage at the server 102. In other embodiments, the amount of time may include the amount of time from when a request received from a client computer system 108 to when a webpage is sent from the server 102 to the client computer system 108. In other embodiments, the amount of time to load a webpage may include the amount of time to generate the webpage at the server 102, send a webpage to the client computer system 108, and have the webpage rendered at the client computer system 108.

The server 102 may also include an efficiency calculator 112. The efficiency calculator 112 may include computation hardware and logic that is configured to compute webpage efficiency and overall website efficiency. In some embodiments, the efficiency calculator may store target performance metrics, such as target load times and/or creation times, for webpages in the website 104. The efficiency calculator 112 may receive from the timer 110 an indication of an amount of time it took to load a webpage. The efficiency calculator 112 can use this information to determine webpage efficiency.

The efficiency calculator 112 may further receive from the website 104 information about how often webpages are accessed as compared to other webpages at the website 104. The efficiency calculator 112 can use this information to compute website efficiency. In particular, in some embodiments, website efficiency is computed by weighting each webpage's efficiency according to how often they are accessed. The weighted efficiencies are then combined to create an overall website efficiency.

Note that in some embodiments, load times could be received from the client computer system 108. For example, the client computer system could track when a request for a webpage was issued and when a webpage was finally rendered at the client computer system 108, for example, using the timer 114. In an alternative embodiment, the amount of time to load the webpage may be simply the amount of time from when the webpage was delivered from the server 102 to when the webpage was finally rendered (i.e., all visual parts of the webpage displayed and any functional parts of the webpage able to perform functions) at the client computer system 108. From this information, the client computer system 108 could determine the amount of time it took to render a webpage. The client computer system 108 could send this information to the server 102, which could use this information to compute webpage and website efficiency. The client could send this information as part of an HTTP (or other) protocol message. Alternatively or additionally, the client may have an applet or other software configured to perform this function. In some embodiments, the client computer system is part of a test system, and not accessible to real world users, but is simply configured for testing websites.

By evaluating webpages in a website against a target, a website administrator can quickly and efficiently identify webpages that adversely affect a website's performance. The administrator can use this information to prioritize which webpages in a website should be evaluated and have remedial actions applied to improve the performance of the website as a whole.

Alternatively, the server 102 may include functionality for performing automatic remediation of webpage inefficiencies. For example, the server 102 may automatically analyze webpages that do not meet target efficiencies to attempt to automatically repair or identify problems with such pages. Alternatively or additionally, the server 102 may perform brute force remediation by allocating additional resources, such as additional compute, memory, and storage resources to webpages not meeting target efficiencies to attempt to force the webpages to meet or at least approach target efficiencies.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
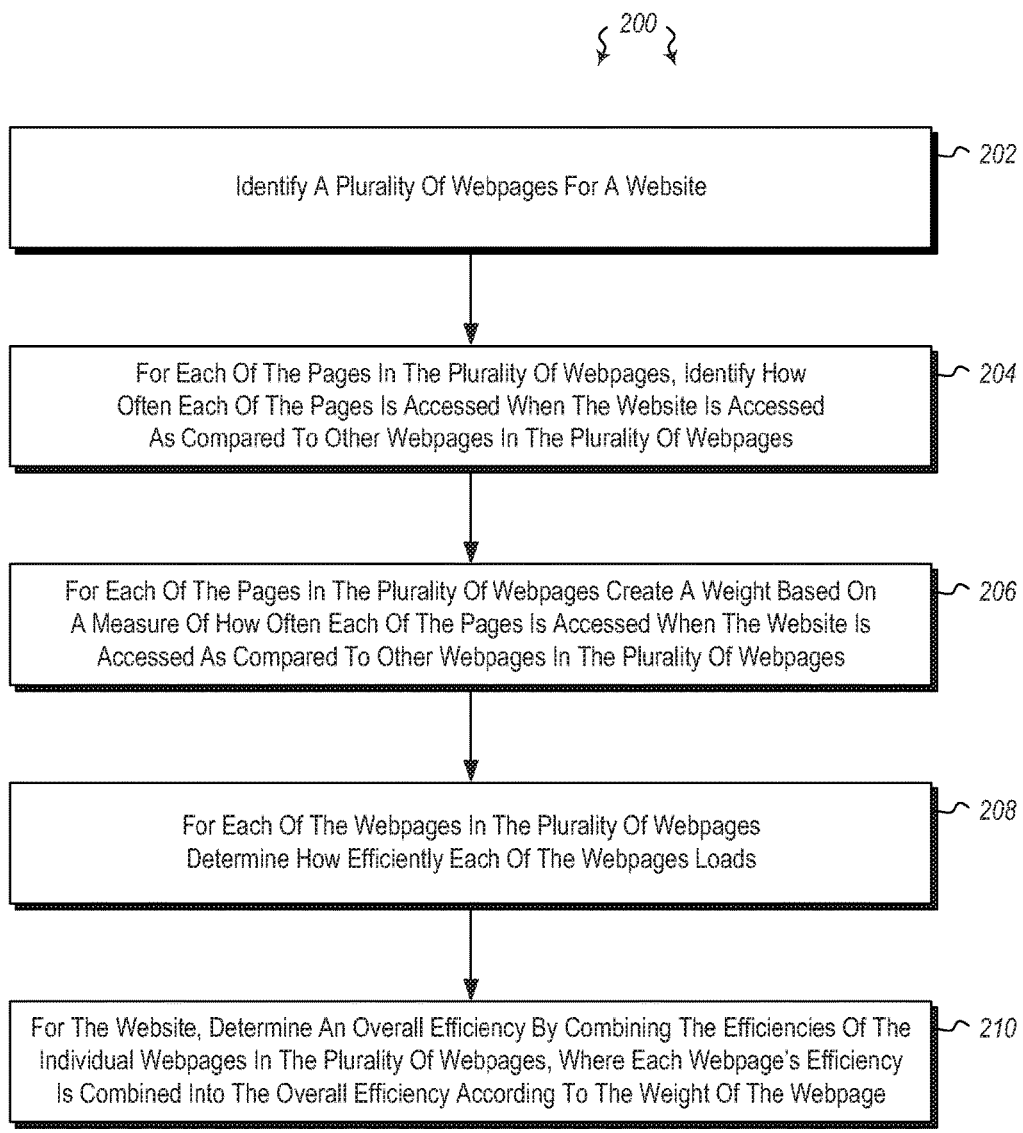
FIG. 2 illustrates a method of determining the efficiency of a website.

Referring now to FIG. 2, a method 200 is illustrated. The method 200 may be practiced in a computing environment and includes acts for determining the efficiency of a website. The method 200 includes identifying a plurality of webpages for the website (act 202).

The method 200 further includes, for each of the pages in the plurality of webpages, identifying how often each of the pages is accessed when the website is accessed as compared to other webpages in the plurality of webpages (act 204).

The method 200 further includes, for each of the pages in the plurality of webpages creating a weight based on a measure of how often each of the pages is accessed when the website is accessed as compared to other webpages in the plurality of webpages (act 206).

The method 200 further includes, for each of the webpages in the plurality of webpages determining how efficiently each of the webpages loads (act 208).

The method 200 further includes, for the website, determining an overall efficiency by combining the efficiencies of the individual webpages in the plurality of webpages, where each webpage's efficiency is combined into the overall efficiency according to the weight of the webpage (act 210).

The method 200 may be practiced where determining how efficiently each of the webpages loads comprises determining how efficiently one or more of the webpages load as compared to predetermined performance targets for each of the webpages.

The method 200 may be practiced where determining how efficiently each of the webpages loads comprises determining a raw score for how quickly each of the webpages load.

The method 200 may be practiced where determining how efficiently each of the webpages loads comprises determining an amount of time it takes to dynamically generate one or more webpages.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that early computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system enabled to determine the efficiency of a website, the system comprising:
   one or more processors; and
   one or more computer-readable media having stored thereon instructions that are executable by the one or more processors to configure the computer system to determine the efficiency of the website, including instructions that are executable to configure the computer system to perform at least the following:
   identify a plurality of webpages for the website;
   for each webpage in the plurality of webpages, identify how often each of the pages is accessed when the website is accessed as compared to other webpages in the plurality of webpages;
   determine a weight for each webpage in the plurality of webpages, the weight for the each webpage being based on a frequency of access for the each webpage relative to a frequency of access of all webpages in the plurality of webpages;
   determine an efficiency for each webpage in the plurality of webpages, the efficiency for the each webpage being based at least upon a loading time for the each webpage; and
   calculate an overall efficiency for the website, the overall efficiency being a weighted sum of the efficiencies of each webpage in the plurality of webpages, the efficiency of the each webpage being weighted by the determined weight for the each webpage.

2. The system of claim 1, wherein determining how efficiently each of the webpages loads comprises determining how efficiently one or more of the webpages load as compared to predetermined performance targets for each of the webpages.

3. The system of claim 1, wherein determining how efficiently each of the webpages loads comprises determining a raw score for how quickly each of the webpages load.

4. The system of claim 1, wherein determining how efficiently each of the webpages loads comprises determining an amount of time it takes to dynamically generate one or more webpages.

5. The system of claim 1, wherein determining how efficiently each of the webpages loads comprises determining an amount of time it takes to render a webpage at a client computer system based on information received from the client computer system.

6. The system of claim 1, wherein one or more computer-readable media further have stored thereon instructions that are executable by the one or more processors to configure the computer system to perform automatic remediation for webpages that do not meet a target efficiency.

7. The system of claim 6, wherein performing automatic remediation comprises automatically scanning webpages to identify issues with the webpages that contribute to the webpages not meeting target efficiencies.

8. The system of claim 6, wherein performing automatic remediation comprises automatically allocating resources to loading webpages not meeting target efficiencies.

9. In a computing environment, a method of determining the efficiency of a website, the method performed by executing computer executable instructions upon one or more computer processors in the computing environment, the method comprising:
   identifying a plurality of webpages for the website;
   for each webpage in the plurality of webpages, identifying how often each of the pages is accessed when the website is accessed as compared to other webpages in the plurality of webpages;
   determining a weight for each webpage in the plurality of webpages, the weight for the each webpage being based on a frequency of access for the each webpage relative to a frequency of access of all webpages in the plurality of webpages;
   determining an efficiency for each webpage in the plurality of webpages, the efficiency for the each webpage being based at least upon a loading time for the each webpage; and
   calculating an overall efficiency for the website, the overall efficiency being a weighted sum of the efficiencies of each webpage in the plurality of webpages, the efficiency of the each webpage being weighted by the determined weight for the each webpage.

10. The method of claim 9, wherein determining how efficiently each of the webpages loads comprises determining how efficiently one or more of the webpages load as compared to predetermined performance targets for each of the webpages.

11. The method of claim 9, wherein determining how efficiently each of the webpages loads comprises determining a raw score for how quickly each of the webpages load.

12. The method of claim 9, wherein determining how efficiently each of the webpages loads comprises determining an amount of time it takes to dynamically generate one or more webpages.

13. The method of claim 9, wherein determining how efficiently each of the webpages loads comprises determining an amount of time it takes to render a webpage at a client computer system based on information received from the client computer system.

14. The method of claim 9 further comprising performing automatic remediation for webpages that do not meet a target efficiency.

15. The method of claim 14, wherein performing automatic remediation comprises automatically scanning webpages to identify issues with the webpages that contribute to the webpages not meeting target efficiencies.

16. The method of claim 14, wherein performing automatic remediation comprises automatically allocating resources to loading webpages not meeting target efficiencies.

17. A webserver configured to provide webpages for a website and the determine the efficiency of the website, the webserver comprising:
   one or more computer processors;
   one or more computer readable memory devices having computer executable instructions encoded therein which, when executed in the webserver upon the one or more computer processors enable the webserver to implement an efficiency calculator, wherein the efficiency calculator is configured to:
   for each webpage in a plurality of webpages for a website, identify how often each of the pages is accessed when the website is accessed as compared to other webpages in the plurality of webpages;
   determine a weight for each webpage in the plurality of webpages, the weight for the each webpage being based on a frequency of access for the each webpage relative to a frequency of access of all webpages in the plurality of webpages;
   determine an efficiency for each of the webpages loads, the efficiency for the each webpage being based at least upon a loading time for the each webpage; and
   calculate an overall efficiency for the website by computing a weighted sum of the efficiencies of the individual webpages in the plurality of webpages, wherein each webpage's efficiency is combined into the overall efficiency according to the determined weight of the individual webpage.

18. The webserver of claim 17 further comprising a timer, wherein the timer is configured to determine how quickly webpages load.

19. The webserver of claim 18, wherein the timer is configured to determine how quickly a webpage is dynamically created.

20. The webserver of claim 17, wherein the efficiency calculator is configured to receive information from a client computing system about how quickly webpages load at the client computing system.

* * * * *